United States Patent [19]
Watts

[11] Patent Number: 4,750,761
[45] Date of Patent: Jun. 14, 1988

[54] OILWELL TUBULAR CONNECTION

[76] Inventor: John D. Watts, 5054 Stanhope, Houston, Tex. 77084

[21] Appl. No.: 18,300

[22] Filed: Feb. 24, 1987

Related U.S. Application Data

[62] Division of Ser. No. 897,069, Jul. 18, 1986.

[63] Continuation-in-part of Ser. No. 897,069, Jul. 7, 1986, which is a continuation-in-part of PCT US85/00260 filed Feb. 19, 1985, published as WO86/03275, Jun. 5, 1986, which is a continuation-in-part of PCT US84/01936 filed Nov. 23, 1984, abandoned.

[51] Int. Cl.[4] ............................................. F16L 55/00
[52] U.S. Cl. ........................................ 285/14; 285/94; 285/333; 285/334.4; 285/397; 285/908; 285/924; 403/296; 411/188
[58] Field of Search ................. 285/94, 908, 350, 355; 411/187, 188; 285/333, 334, 14, 924, 328, 334.4, 397; 403/292, 296, 267, 34, 343

[56] References Cited

U.S. PATENT DOCUMENTS

| | | | |
|---|---|---|---|
| 735,030 | 7/1903 | Campbell | 403/34 |
| 1,907,522 | 5/1933 | Eaton | 403/34 |
| 1,938,255 | 12/1933 | Hinderliter | 285/370 X |
| 2,075,427 | 3/1937 | Church | 285/333 X |
| 2,101,514 | 12/1937 | Schmous | 411/188 X |
| 3,140,967 | 7/1964 | Kaufmann et al. | 403/296 X |
| 3,359,013 | 12/1967 | Knox et al. | 285/334 X |
| 3,472,534 | 10/1969 | Stevens | 285/350 X |
| 3,822,902 | 7/1974 | Mourer et al. | 285/333 X |
| 4,588,213 | 5/1986 | Bollfrass | 285/333 X |

Primary Examiner—Dave W. Arola

[57] ABSTRACT

A connection (20) for oilwell tubular joints (8 and 9) to effect a fluid tight conduit wherein one of two cooperating stop shoulders (19) of limited dimension is formed with peaks (22) and valleys (24) such that the peaks contact the other stop shoulder (18) upon full make-up of the connection so as to provide channels (24) for the escape of lubricant from between the shoulders and thereby effect a higher overload torque capacity for the connection, without sacrificing other characteristics of the connection.

9 Claims, 1 Drawing Sheet

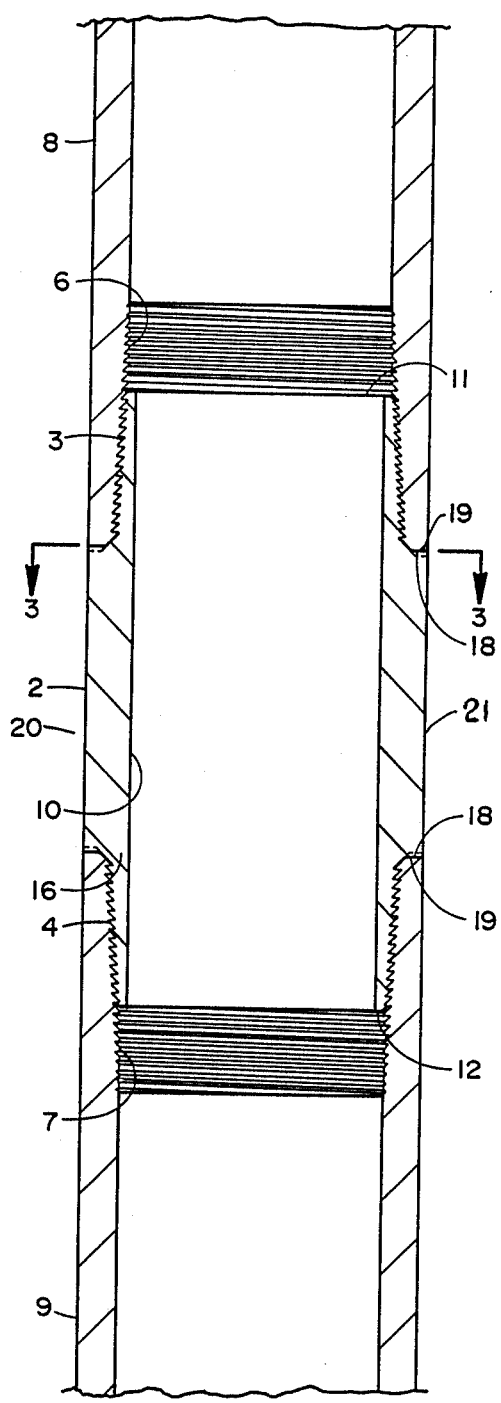
FIG. 1
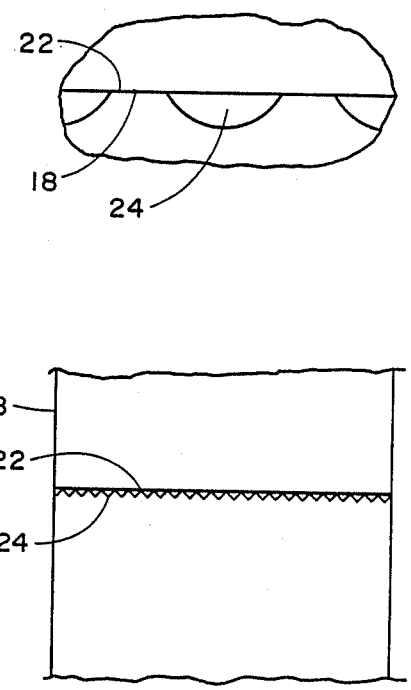
FIG. 4
FIG. 2
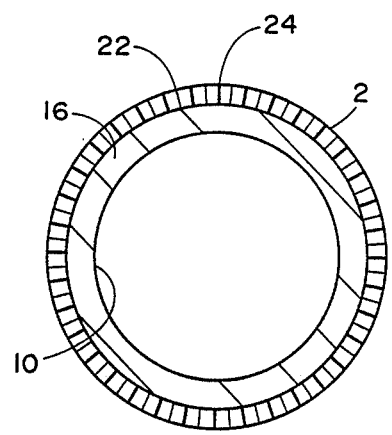
FIG. 3

OILWELL TUBULAR CONNECTION

This application is a continuation-in-part of prior U.S. application Ser. No. 897,069 filed July 7, 1986 which is a continuation-in-part of PCT/US85/00260 filed Feb. 19, 1985 which is a continuation-in-part of PCT/US84/01936 filed Nov. 23, 1984 now abandoned.

TECHNICAL FIELD

The outer diameters of conventional threaded pipe couplings are substantially greater than the outer diameter of the pipe joints that they connect and the same is true for couplings of most strings of casing and tubing installed within oilwells; however, several constraints are presented by oilwells that are not normally present in surface piping systems. Each consecutive string including couplings, must pass within a hole bore diameter established by a drill or by a previously set string of pipe. Additionally, there must be sufficient clearance between that bore and the maximum diameter of the string being run so as to lower it freely without sticking and to allow sufficient flow area through the annulus then formed for fluids, without causing an unacceptable pressure drop caused by friction of the flowing fluid. Thirdly, oilwell strings must withstand axial tension, bending and compression loads caused by the weight of miles of pipe that may be hanging within the well. Further, oilwell strings may be subject to external fluid pressures greater than internal pressures to thereby introduce a tendency to collapse the pipe. For these and other reasons, joints with upset ends, the pipe wall thickness at the connection being greater than the pipe wall thickness intermediate the connections, have been introduced to work in the presence of such constraints. However, such solutions result with the outer diameters of connections being greater than the outer diameter of the pipe joints that they connect. There do exist, connections for pipe not having upset ends wherein one end of a joint is threaded externally and the other end is threaded with a mating internal thread such that joints can be screwed together to result in a connection with an outer diameter no larger than the pipe mid-section. However, such joints, such as Hydril FJ® Premium tubing connections, enjoy only 42% axial tension strength as compared to the unthreaded pipe wall, about the same as non-upset API tubing connections.

Presently, due to diameter constraints, a typical oilwell pipe program may be: 5-½" OD×2-⅞" OD×1.6" OD. To be far more advantageous, a 2-⅞" OD×1.6" OD×1.05" OD program can often make an installation possible due to clearance or cost reasons that the typical program above could not and in every case, a less expensive and a more efficient installation should result. Many tons of steel, mud, cement plus drilling costs per oilwell may therefore be saved from waste. When a pipe having no reduced wall thickness contains fluid pressure, the axial stress within that wall caused by fluid pressure is approximately one-half of the circumferential stress within that wall caused by the same pressure and therefore a like amount of mechanical axial stress may be applied by pipe weight or the like, without the axial stress exceeding the circumferential stress. Reduction of the pipe wall thickness as by a thread formed on a joint of non-upset pipe, will therefore reduce still further, the magnitude of axial stress that may be dedicated to support pipe weight. When the axial strength of an oilwell tubular string is substantially reduced by the connection strength, the setting depth of that string may be so severely reduced such that a connection of greater diameter is required that will in turn, increase the required diameter of all other strings of pipe in the well.

There is therefore a substantial need for a flush joint tubular connection having a higher axial strength and with no loss of the connection's ability to seal against fluid pressure.

The overtightening or undertightening of oilwell tubular connections is a common cause of their failure. Overtightening a conventional tubing connection can cause yielding of threads and stop shoulders, such that subsequent assembly cannot effect a leak tight joint particularly when later mated with different joints. Undertightening will allow leakage and/or tension failure. Wear and damage of threads on the tubulars and the use of thread compounds having different coefficients of friction further increase the difficulty of torquing a tubular connection to the proper torque for best performance. With particular regard to conventional flush joint tubular connections that inherently have less wall thickness than upset end connections, the problem of precise makeup becomes even more critical, in that: conventional flush joint connections are weaker in every way than upset end connections; and therefore, to gain rated performance from flush joint connections, it is necessary to torque them within a very narrow range of torque to make the connection tight enough to perform but not so tight as to cause damage thereto.

Since torques imposed during service cannot be precisely controlled, often strings of pipes are damaged beyond use by overtorque and it is well known that pipe strings can be loosened or separated at the connections by reverse torques when they have not been made up sufficiently tight. The advantages and need for a flush joint tubular connection having high mechanical strength, and excellent sealing ability, that can accept a wide range of make up torque is now clear.

BACKGROUND ART

A flush joint tubular connection has an outer diameter substantially the same as the tubing joints which the connection joins.

Standard API non-upset tubing connections comprise couplings having outer diameters considerably larger than the pipe outer diameter but still only enjoy approximately 42% efficiency as above. API does list a "turned down" collar outer diameter to increase clearance between strings; however, the "turned down" diameter still exceeds substantially, the piper outer diameter.

No prior art discloses a flush joint tubular connection having tapered threads, that when properly assembled, effects optimum stresses within the small end of the external thread and within the large end of the internal thread so as to provide a connection of maximum efficiency. Conventional pipe connections have threads with like tapers and result in a constant diametrical interference along the taper between the external and internal threads, thereby causing excessive stresses or requiring increased wall thickness at the end of the pipe. Excessive stresses reduce the joint strength and an increased wall thickness rules out a flush joint connection.

Historically, the most popular flush joint tubular connection is made by the Hydril® Co., and covered by numerous patents and comprises straight threads and a tapered mating seal between the two joints of tubing resulting in a premium joint of high cost and according to published data, enjoys only 42% axial strength with regard to the pipe wall. Since the straight threads cannot seal against fluid pressure, a seal against internal fluid pressure is provided on a pitch circle smaller than the pitch circle of the threads and a seal against external fluid pressure is provided on a pitch circle larger than the pitch circle of the threads. Upon tightening of the joint, the seal of least diameter contacts before the seal of greatest diameter, the seal of greatest diameter acting as a stop shoulder to limit tightening of the connection. However, since the non-upset wall of the pipe must be radially divided into at least three parts (i.e. inner seal, thread, and outer seal) the radial width of the stop shoulder must be substantially less than the wall thickness of the pipe. Also, the shoulder material can be no stronger than the pipe materail to increase torque capacity, because it is formed on the non-upset end of the pipe. Additionally, when pipe compound used to lubricate the connection is trapped between the threads and the outer seal, incomplete make-up may result because no provision is made to allow escape of the thread compound during make-up. When complete make-up does occur with thread compound trapped between the inner and outer seals, thermal expansion of the thread compound can cause excessive pressure there between to result in damage to or disengagement of the threads. With the high lubricity of the thread compound acting between the stop shoulders, counter torque between shoulders of limited dimension is lower which may allow undesirable overtightening of the connection. When the connection is overtightened, the stop shoulders fail in bearing and loosening and leakage can then occur and the neck section of the external thread may be greatly overstressed and thereby cause premature failure of the connection. It is therefore clear that a flush joint tubular connection having a wider acceptable range of make-up torque is needed for use within oilwells.

It is also clear that a flush joint connection having a high axial strength and a more certain ability to seal as provided by the instant invention is needed for use within oilwells and in other pipe assemblies wherein radial clearance is crucial.

DISCLOSURE OF INVENTION

The present invention discloses means to improve the integrity of and to increase the range of acceptable make-up torque for a tubular connection of limited dimension without reducing other capabilities of the connection.

The end of the tubing joints may be formed with threads and with annular stop shoulders of limited dimension for connection with couplings formed with mating threads and cooperating annular shoulders so as to seal the connections against fluid pressure and to limit make-up of the connections respectively to a desired relative axial position of the mating threads and within a predetermined desired torque range. The coupling may be formed of a material stronger and harder than the tubing material so as to provide a sliding combination of mating threads and shoulders that is less susceptible to galling than a combination of like materials would be. The cooperating shoulders of the couplings may be formed so as to provide alternate peaks and valleys such that the peaks will abut stop shoulders of the tubing joints upon full make-up of the connection and such that excess thread compound being squeezed from the threads during make-up, may pass freely through the valleys and thereby prevent entrapment of the thread compound between the shoulders or between the shoulders and the threads.

It is therefore clear that initial metal to metal contact of the coupling peaks against the tubing joint stop shoulders will wipe the peaks clear of thread compound and produce a higher resisting or torque for a given axial load between the stop shoulders and the cooperating shoulders than would occur if the excellent lubricity of the thread compound was acting between shoulders without peaks and valleys. Typically, the allowable torque increase absorbed by the shoulder will be proportional to the ratios of respective coefficients of friction, for example: 0.2 for steel to steel and 0.021 for API modified thread compound, a torque multiple of 10 that can be absorbed by the shoulder. This increase in torque capacity is over and above that required to make up the threads, and without sacrifice of other capabilities of the connection. Therefore, the range of acceptable make-up torque on a shoulder of given dimension is greatly increased to make proper make-up more certain and to extend the acceptable range of torque that may be applied in service.

It is also clear that since thread compound cannot be trapped between the threads and the stop shoulder, the tendency for geothermal expansion of the thread compound to overpressure and damage the connection is avoided by the present invention. Should pressurized fluid within the tubular members leak past the engaged threads, as may be allowed by damaged threads, the fluid can pass freely through the valleys to the outside and not act to expand the internally threaded member at a section of reduced wall thickness to thereby cause thread jumpout, as may occur if the shoulders formed a seal there between.

When used in combination with features of my co-pending application U.S. Pat. No. 897,069 filed July 18, 1986, the present invention may provide a flush joint tubular connection of maximum torque capability without sacrificing other capabilities because the double pin coupling disclosed in the referenced application may be of a smaller internal diameter than that of the tubing and may be made of a higher strength material so as to utilize the full elastic circumferential strength of the pipe wall to generate higher sealing forces and a higher resisting torque against the coupling thread which is additive to the increased shoulder torque described above.

BRIEF DESCRIPTION OF THE DRAWING

FIG. 1. depicts a vertical section of a connector in accord with the present invention.

FIG. 2. is an elevation view of FIG. 1.

FIG. 3. is a horizontal section taken along A—A of FIG. 1.

FIG. 4. is and enlarged detail of FIG. 2.

DETAILED DESCRIPTION OF THE INVENTION

FIG. 1 depicts a tubular connection shown generally at 20 comprising coupling 2 with tapered external threads 3 formed on an upper portion and having like threads 4 formed on a lower portion, so as to mate in sealing engagement with tapered internal threads 6 and 7 formed within joints of tubing 8 and 9, respectively, to be connected by coupling 2.

Coupling 2 may comprise inner diameter 10, upper end surface 11 and lower end surface 12. Threads 3 and 4 may or may not engage the full length of threads 6 and 7 respectively, as may be desired.

Since tubing joints may have lengths of sixty times or more the lengths of couplings that connect them, the couplings may be formed of material much stronger than the material the joints are formed of without causing a significant increase of cost for the entire string. The use of higher strength material for the coupling 2 makes possible a higher axial strength for a connection of given bore, because the strength of the coupling at neck section 16 is increased and because, collapse resistance of the pipe end as adjacent surface 12 is increased to thereby increase the pullout strength also.

Connection 20 may comprise annular stop shoulders as at 18 formed on the end of joint 9 and cooperating annular shoulder 19 formed on coupling 2 intermediate thread 4 and the outer diameter 21 of coupling 2. The mating threads are dimensioned so as to make-up as shown in FIG. 1 to provide increased bending strength and greater torsional strength as shoulders 18 and 19 abut upon make-up.

Shoulders 19 of coupling 2 may be formed as shown in FIGS. 2, 3 and 4, with peaks as at 22 and with valleys as at 24 alternately, so as to provide mating contact between peaks 22 and stop shoulders 18 of joints 8 and 9 upon make-up of connection 20. As make-up of the threads progress, thread compound applied to the threads to lubricate and seal imperfections in the forms thereof, is squeezed outwardly between shoulders 18 and 19. Just before complete make-up of the connection, thread compound continues to flow from the threads outwardly through valleys 24 instead of being trapped between shoulders 18 and 19 or between the threads and the shoulders as would occur if cooperating shoulder 19 was smooth and the peaks and valleys were not present. Thus, entrapment of compound is averted which could thermally expand to damage the connection. Upon continued make-up of the connection, peaks 22 contact shoulders 18, wiping the peaks clear of thread compound and thereby establishing metal to metal contact there-between so as to cause an obvious abrupt increase in resisting torque between the shoulders so as to substantially increase the range of acceptable make-up torque and operating torque of the connection without sacrificing other operating characteristics such as wall thickness, tension strength, or the ability to seal against fluid pressures.

Aided by the specifications and drawings presented herein, others skilled in the art may evolve other embodiments of the present invention; however, my disclosure of only one embodiment is in no way meant to limit the scope thereof.

I claim:

1. A tubular conduit connection comprising a first tubular member formed with threads and an annular stop shoulder, a second tubular member formed with threads dimensioned for sealing cooperation with the threads of the first member and an annular cooperating shoulder positioned so as to abut the stop shoulder upon full makeup of the connection, the improvement being: the cooperating shoulder being evenly formed with peaks and valleys such that only said peaks may contact the stop shoulder; the peaks being of such dimension that movement from first contact of the peaks with the stop shoulder to full makeup will wipe the peaks clear of any fluid present to thereby establish metal-to-metal contact between the peaks and the stop shoulder.

2. The invention of claim 1 wherein: said valleys form flow passages across the top shoulders upon make-up of the connection such that thread compound that may be squeezed from between the mating threads will not be trapped in an annular cavity that may be formed between the threads and the shoulders.

3. The invention of claim 1 or 2 wherein: said peaks are formed so as to wipe thread compound from a portion of the stop shoulder sufficiently to prevent entrapment of thread compound between said peaks and the top shoulder upon full make-up of the connection.

4. The invention of claim 1 wherein the threads comprise: an external tapered thread and a cooperating internal tapered thread; the external thread having a smaller included angle of taper than the internal thread such that upon progressive makeup of the connection, fluid will be continously expelled from between the threads to flow between the shoulders until full makeup of the connection is completed.

5. A first tubular member formed with threads and an annular stop shoulder, the threads being dimensioned for sealing cooperation with threads formed on a second tubular member, the second tubular being formed with an annular cooperating shoulder positioned so as to abut the stop shoulder upon full make up of the threads whereby a pressure tight fluid conduit connection is formed, the improvement being: the stop shoulder being formed with peaks and valleys such that the peaks may contact the cooperating shoulder and allow fluid to flow through the valleys sufficiently to prevent its entrapment between the threads and the cooperating shoulders; the peaks being of such dimension that movement from first contact of the peaks with the cooperating shoulder to full makeup will wipe the peaks clear of any fluid present to thereby establish metal-to-metal contact between the peaks and the cooperating shoulder.

6. The invention of claim 5 wherein the first member comprises: an external thread formed on each end thereof; a bore of smaller dimension than the bore of the second member; a length of less dimension than the length of the second member; such that the first member may be used as a coupling of improved strength for joining long lengths of tubing formed as is the second member.

7. The invention of claim 6 wherein: the first member is formed from a material of higher strength than the material from which the second member is formed.

8. A first tubular member formed with threads and an annular cooperating shoulder, the threads being dimensioned for sealing connection with cooperating threads formed on a second tubular member, the second tubular member being formed with an annular stop shoulder positioned so as to abut the cooperating shoulder upon full makeup of the threads whereby a pressure tight fluid conduit connection is formed, the improvement being: the stop shoulder being formed with peaks and valleys such that only the peaks may contact the cooperating shoulder and allow fluid to flow through the valleys sufficiently to prevent its entrapment between the threads and the cooperating shoulder; the peaks being of such dimension that movement from first contact of the peaks with the cooperating shoulder to full makeup will wipe the peaks clear of any fluid present to thereby establish metal-to-metal contact between the peaks and the cooperating shoulder.

9. The invention of claim 8 wherein the second member comprises: an external thread formed on each end thereof; a bore of smaller dimension than the bore of the first member; a length of smaller dimension than the length of the first member; such that long joints formed as is the first member may be connected on each end of the second member to form a fluid conduit of improved strength.

* * * * *